United States Patent
Eberhardt et al.

(10) Patent No.: US 7,487,909 B2
(45) Date of Patent: Feb. 10, 2009

(54) SYSTEM AND METHOD FOR PROCESSING VALUE UNITS

(75) Inventors: Jens Eberhardt, Grünwald (DE); Werner Fiedler, Bruchberg (DE); Hermann Geßler, Seefeld (DE); Heinz Kochbeck, Starnberg (DE); Henning Nattmann, München (DE); Udo Schwartz, München (DE); Martin Thorbjörnson, Otterfing (DE)

(73) Assignee: Giesecke & Devrlent GmbH, Munich (DE)

( * ) Notice: Subject to any disclaimer, the term of this patent is extended or adjusted under 35 U.S.C. 154(b) by 124 days.

(21) Appl. No.: 10/562,861

(22) PCT Filed: Jun. 28, 2004

(86) PCT No.: PCT/EP2004/007001

§ 371 (c)(1),
(2), (4) Date: Apr. 11, 2006

(87) PCT Pub. No.: WO2005/001779

PCT Pub. Date: Jan. 6, 2005

(65) Prior Publication Data
US 2006/0212372 A1    Sep. 21, 2006

(30) Foreign Application Priority Data
Jun. 30, 2003   (DE) ................. 103 29 321

(51) Int. Cl.
  *G07F 19/00*  (2006.01)
(52) U.S. Cl. ............... 235/379; 235/375; 235/487; 705/45

(58) Field of Classification Search ............... 235/379, 235/375, 483, 485, 487; 902/12–17, 7–9; 705/43
See application file for complete search history.

(56) References Cited

U.S. PATENT DOCUMENTS

| | | | |
|---|---|---|---|
| 4,991,008 A | | 2/1991 | Nama |
| 5,247,159 A | * | 9/1993 | Yuge et al. ............... 235/379 |
| 5,870,487 A | | 2/1999 | Graves et al. |
| 5,905,810 A | | 5/1999 | Jones et al. |
| 5,912,982 A | | 6/1999 | Graves et al. |
| 5,937,396 A | * | 8/1999 | Konya ................. 705/43 |
| 5,966,456 A | | 10/1999 | Jones et al. |
| 6,012,565 A | * | 1/2000 | Mazur ................. 194/207 |

(Continued)

FOREIGN PATENT DOCUMENTS

| | | |
|---|---|---|
| DE | 100 02 641 | 8/2001 |
| DE | 100 49 435 | 4/2002 |
| EP | 0 690 423 | 1/1996 |
| WO | WO 99/27488 | 6/1999 |
| WO | WO 03/029913 | 4/2003 |
| WO | PCT/EP2004/007001 | 6/2004 |

*Primary Examiner*—Edwyn Labaze
(74) *Attorney, Agent, or Firm*—Bacon & Thomas, PLLC

(57) ABSTRACT

The invention relates to a system and method for processing value units, such as bank notes, coins or checks. A system and method for processing deposits of value units are provided by which bank notes of the deposit are checked successively in two bank note processing machines, and the data of both the first and second checking operations are supplied to an evaluation device in order to perform an evaluation of the deposit on the basis of both the first and second checking operations. This two-stage processing provides the possibility of carrying out the processing of deposits in cash centers considerably more efficiently than with hitherto used methods.

31 Claims, 2 Drawing Sheets

U.S. PATENT DOCUMENTS

| | | |
|---|---|---|
| 6,129,273 A | 10/2000 | Shah |
| 6,241,069 B1 | 6/2001 | Graves et al. |
| 7,103,438 B2 * | 9/2006 | Hallowell et al. ........... 700/116 |
| 2002/0020603 A1 | 2/2002 | Jones et al. |
| 2002/0063035 A1 | 5/2002 | Blad et al. |
| 2003/0015395 A1 | 1/2003 | Hallowell et al. |
| 2004/0225407 A1 * | 11/2004 | Kunz et al. ................. 700/213 |
| 2006/0120560 A1 * | 6/2006 | Davis et al. ................. 382/100 |

* cited by examiner

SYSTEM AND METHOD FOR PROCESSING VALUE UNITS

BACKGROUND

This invention relates to a system and method for processing bank notes, coins, checks or other value units.

In various countries, commercial enterprises are increasingly being engaged to take charge of and perform certain tasks in the logistics of circulation of cash in so-called cash centers. Tasks performed by such cash centers are for example to account for stocks of cash delivered by customers and to make up and deliver amounts of cash desired by customers in the desired amount. Such stocks of cash assigned to a special process, which can comprise not only bank notes but in some cases also coins, checks, postage stamps, amounts of gold or the like, are normally also referred to as "deposits".

These tasks to be performed by the cash center require a high time investment and deployment of personnel, as experience shows.

SUMMARY

On these premises, it is the problem of the present invention to provide a system and method for processing value documents which can improve the processing of the value documents in cash centers.

The invention is thus for instance solved by a system and method for processing deposits of value documents by which bank notes of the deposit are checked successively in two bank note processing machines, and the data of both the first and second checking operations are supplied to an evaluation device in order to perform an evaluation, in particular also an accounting, of the deposit on the basis of both the first and second checking operations. Accounting is understood here to mean validating the recorded and accounted-for amounts to an associated account of the customer.

This two-stage processing provides the possibility of performing the processing of deposits in cash centers much more efficiently than with hitherto used methods, as will be explained hereinafter in detail by different examples. Although the following lowing discussion will deal specifically with the special problems of bank note processing, these inventive ideas can also be applied to the processing of other value units such as coins, checks, postage stamps or the like.

It should be particularly emphasized that embodiments stated in the description can be used advantageously in combination or else completely or at least partly independently of each other and of the subject matter of the main claims.

BRIEF DESCRIPTION OF THE DRAWINGS

The invention will be explained and described in more detail hereinafter with reference to the enclosed drawings, in which.

DETAILED DESCRIPTION OF VARIOUS EMBODIMENTS

First, a usual circulation of money will be explained hereinafter, then essential functions of a cash center in the circulation of money, then various particularly advantageous variants of the operation of a cash center by way of example with reference to different process steps.

Figure 1:
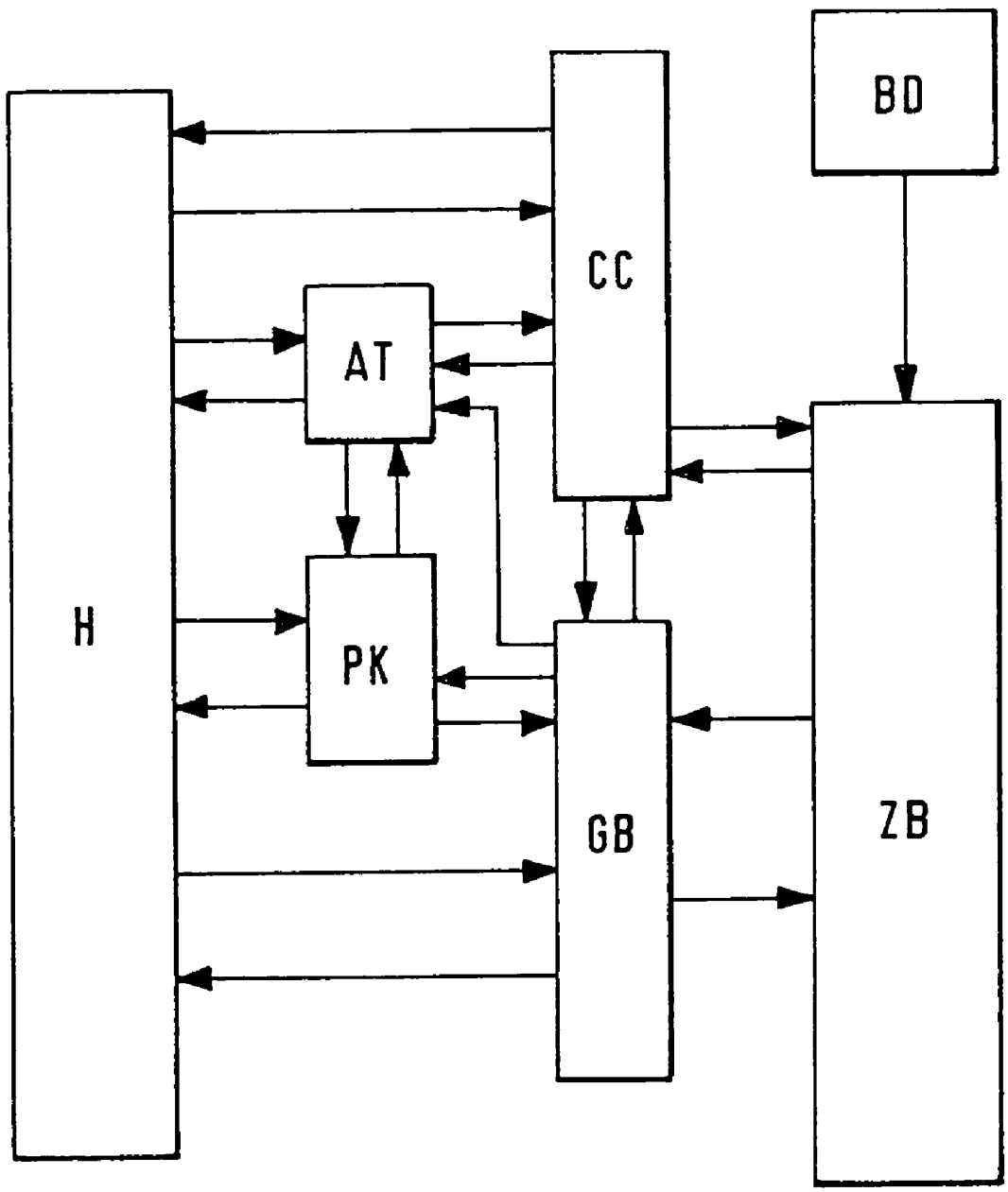
FIG. 1 shows a simplified, schematized representation of a circulation of money.

Circulation of Money:

FIG. 1 shows a variant of the circulation of bank notes in a schematic representation in a greatly simplified form.

In a bank note printing plant BD the bank notes are produced by order of a central bank ZB. Via the central bank ZB the finished bank notes are put into circulation by being issued to individual commercial banks GB or to cash centers CC. Merchants H, which refers here to all commercial businesses, receive their stocks of cash through private customers, i.e. buyers PK, or from the commercial banks GB. For accounting and checking of the deposited stocks of cash, the merchants H pass their stocks of cash on to the cash centers CC or commercial banks GB. The buyers PK in turn receive their cash through the commercial banks GB. Moreover, stocks of cash that were already in circulation can flow back from the commercial banks GB and cash centers CC to the central bank ZB, to be optionally rechecked for authenticity and/or fitness for circulation there and for the destruction of bank notes no longer fit for circulation.

The money flow can be handled here partly by automatic teller machines AT. These may be not only money dispensing devices AT, but also money deposit devices AT and combined money deposit and dispensing devices, so-called recycling devices AT. Thus, customers K receive a large portion of their stocks of cash from dispensing devices AT, while in particular commercial banks GB partly deposit their takings in deposit devices AT for further crediting. The transport of the stocks of cash between the individual units of the circulation of money is preferably effected by security transport companies.

Tasks (Cash Center):

As mentioned above, the cash centers CC can perform different tasks. One essential task is to process cash delivered to the cash centers CC by their business customers. This may be e.g. cash takings which are delivered to the cash centers CC directly by the merchants H or by commercial banks GB or from associated automatic teller machines AT. Processing can consist for example in counting and sorting, connected with an authenticity check and optionally a fitness check of incoming deposits. Deposits refer here in the usual way to units of cash assigned to a certain process (customer, automatic teller machine, date, etc.) which are usually stored and transported in bundled form in a transport container, such as a bank note cassette or bank deposit bag.

Further, stocks of cash can be ordered from the cash centers CC, which are then made up in the desired way and delivered to the customers. These made-up stocks of cash can be used for example for filling money dispensing devices AT or as stocks of change for the merchants H.

It is moreover conceivable that a destruction of bank notes no longer fit for circulation is performed not by the central banks ZB themselves, but also by commercial cash centers CC after a fitness check.

Moreover, cash centers CC can preferably create for their customers an inventory management of their stocks of cash and optionally also inventory optimization or cash demand forecasting, to thereby reduce the costs of unneeded stored stocks of cash with the customers and at the cash center CC itself.

Process Flow (Cash Center):

For carrying out these and other processes, numerous variants are conceivable which are used alternatively or parallel to each other at a cash center.

According to a special idea of the present invention, different processing sequences are performed for different types of deposits, such as deposits delivered by the commercial banks in comparison with deposits from the merchants and/or with deposits from deposit/dispensing devices. The criterion for different processing can for example also consist in the size of the deposits or the type of previous processing operations on the deposits, as to be explained below.

Figure 2:
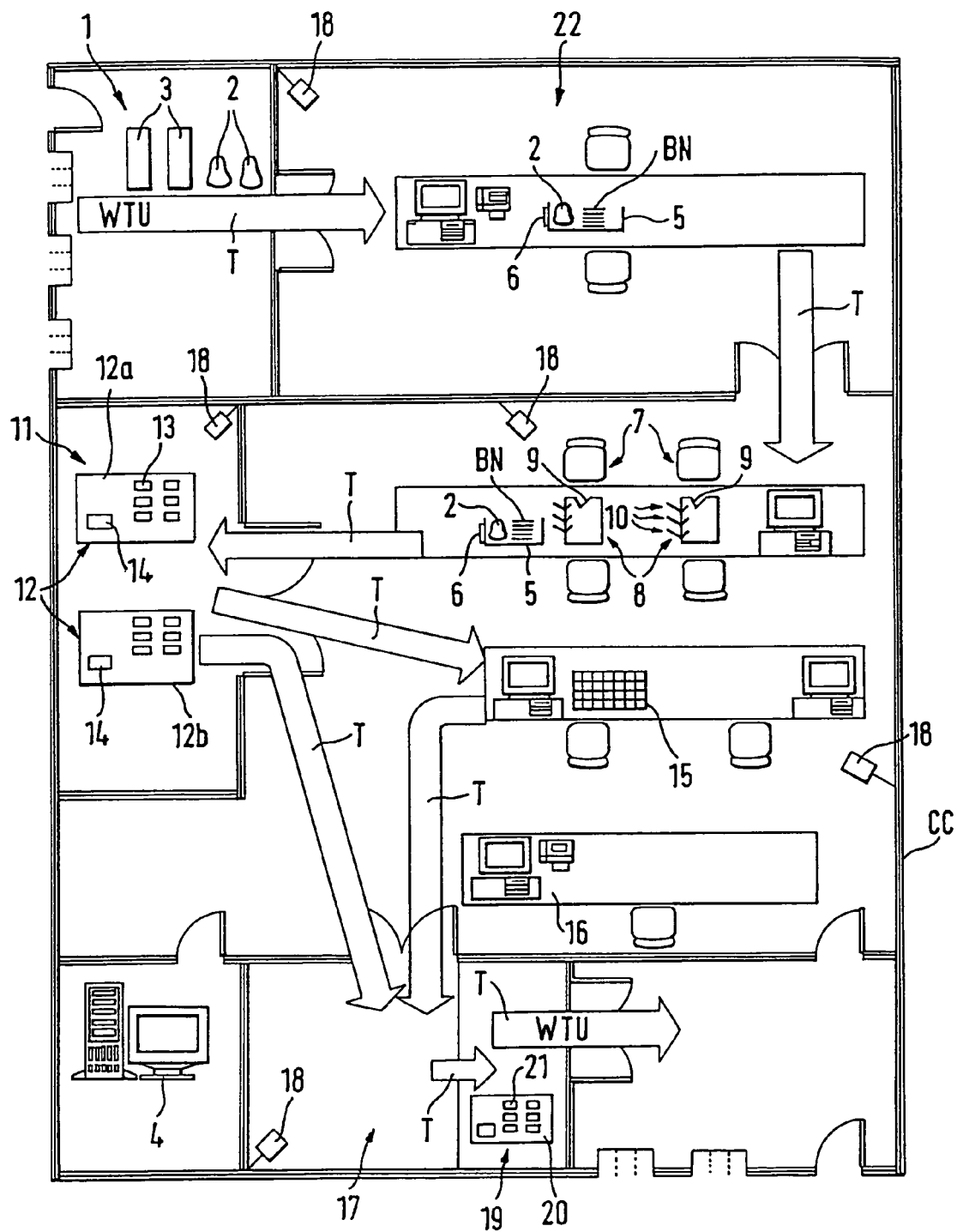
FIG. 2 shows a simplified, schematized representation of a cash center.

For illustration, the differences in the processing sequences will hereinafter be described separately and preferred alternatives shown with reference to single process steps in exemplary fashion, in particular with reference to FIG. 2 showing the structure of a cash center CC in schematic simplified fashion.

a) Preparation of Deposits (Customer):

The deposits can be inputted in transport containers 1 automatically or manually by the customer, so that the cash center CC can store and process separately from each other the stocks of cash of different deposits to be processed. The deposits are assigned to certain customers, i.e. depositors or associated deposit/dispensing devices AT. The customer will optionally send data on the content of the individual deposits to the cash center CC. This can preferably be done via a delivery document with data on all deposits of the customer upon each delivery.

EXAMPLE a1

The deposits are put into associated transport containers 1 manually by the customer, such as a merchant. The transport containers 1 used can be e.g. bank deposit bags 2, i.e. plastic bags that, after the cash is put in, are sealed in such a way that they can only be opened by destruction. The data of the bank notes contained in the transport container 1, such as the number and total value of the bank notes, together with other data (e.g. data on the customer/depositor, date, etc.), are applied to the transport container 1 itself or stored therein.

EXAMPLE a2

The deposits can alternatively also be inputted into cassettes 3. Filling will specifically in this case preferably be effected automatically. The cassettes 3 can be e.g. inserted into money deposit and/or dispensing devices AT and receive deposited bank notes or ones not yet dispensed. In this case the data of the bank notes contained in the cassettes 3, such as the number and total value of the bank notes, together with data on the associated device AT and/or customer, are stored automatically in a memory chip of the cassette 3 itself or externally.

EXAMPLE a3

Preferably, a semiautomatic recording of deposits by the customer can also be provided. This can consist e.g. in a part of the required data, such as the date, time, till (with a merchant H) and/or associated account (of the merchant H or other cash center customer), being already given and the customer only having to state a remaining part of the data (number of bank notes and/or their total amount).

EXAMPLE a4

In particular also in this case, the cash center CC will preferably provide the customer with transport containers 1, specifically bank deposit bags 2 with a chip or associated chip card according to DE 101 55 731 A1, in which the given data are already prestored. This means that the chips do not need to have a processor, but at least a memory for storing data. The customer need then only write the remaining data to the chip.

EXAMPLE a5

The customer can for this purpose, for example, also be given and use a hand-held unit for inputting the required data and storing the data in the chip of the transport container 2. The hand-held unit can have wireless or wired operation, and the data transmission to the chip be effected contactlessly or with contact. The hand-held unit can also have for example, instead of or in addition to a hand-held unit with an entry keyboard or associated touch screen, a scanner for scanning screen contents comprising the required deposit data.

EXAMPLE a6

The data can not only be conveyed from the customer to the cash center CC together with the associated transport container 1 by the data being for example written on the transport container 1 itself or on an associated paper or chip. Alternatively, it is also possible to convey the data separately from the transport of the containers 1. Thus, the data are preferably transmitted from the customer to the cash center CC e.g. via a wireless or wired EDI connection, Internet connection or the like. Transmission can be effected e.g. directly from the deposit and/or dispensing device to a computer 4 as an evaluation device 4 of the cash center CC.

Thus, the customers can e.g. input the data on the deposits, which are subsequently delivered to the cash center CC in the containers 1, in an input mask of an Internet portal of the cash center CC, the data being assigned uniquely to a container 1 in each case by e.g. the data having a serial number assigned thereto which is printed on a sticker by the customer and affixed to the container. The serial number can e.g. also be present as a bar code which is applied to the container or incorporated therein or stored in a chip of the container 1.

Separate conveyance of the deposit data to the cash center has the advantage that persons employed at the security transport company WTU or at the cash center CC have no overview of the values basically expected in the deposit container, so that there is no incentive to steal bank notes that may be erroneously declared and present in excess.

EXAMPLE a7

In the last-named examples the data on the deposits to be delivered to the cash center CC are preferably supplied to the cash center CC before the deposits themselves, so that the cash center can perform a corresponding work planning.

b) Transport of Deposits (Customer-Cash Center):

The deposits to be processed from one or more customers can be picked up and delivered to the cash center CC by security transport companies WTU.

EXAMPLE b1

It can be provided that the banks have drop-in safes or other drop-in containers in which customers can drop their deposits. The security transport companies WTU will then empty the drop-in safes at regular time intervals and deliver the deposits to the cash center CC for further processing and accounting.

EXAMPLE b2

Instead of regular emptying, it can also be provided that the times at which the security transport companies WTU empty the drop-in safes are made dependent on the content of the drop-in safes. This can be effected e.g. by measuring the filling level of the drop-in safe or by determining other quantities that provide information on the amount of cash present in the drop-in safe. If the containers 1 dropped into the drop-in safe by the customer contain for example a chip with associated data on the amount of cash contained therein, this information can be read out in the drop-in safe and used to gain information on the total amount of all stocks of cash contained in the drop-in safe. If the cash contents of all containers 1 cannot be determined in this way, at least predictions of the expected amount of cash located in the container 1 can be considered.

Since the maximum insurance sum of the stocks of cash located in the drop-in safe is usually already reached before the drop-in safe is completely filled, the security transport companies WTU will preferably already empty the drop-in safes before they are completely filled. Emptying can be effected upon a corresponding signal which is produced on the basis of the above-mentioned evaluation of the stocks of cash contained in the drop-in safe.

EXAMPLE b3

It is e.g. also possible to localize the transport containers 1 by means of GPS so as to be always informed about the whereabouts of all containers 1.

c) Receipt of Deposits (Cash Center):

The deposits delivered by the security transport company WTU are removed and checked at the cash center CC. They can at the same time be prepared separately according to bank notes, coins and checks.

EXAMPLE c1

For this purpose the number of transport containers 1 is compared e.g. upon receipt at a processing station 22 at the cash center CC with information located on the particular customer's delivery document which is delivered together with the deposits. In case of discrepancies a corresponding note for data synchronization with the customer is produced and stored for the accounting to be described hereinafter.

Then the transport containers 1 are opened, the contained bank notes BN removed and stored separately from those of other deposits. The assignment of bank notes to the deposits is retained by e.g. the bank deposit bag 2 being stored together with the bank notes BN in a deposit container 5 belonging to the cash center CC.

EXAMPLE c2

It is also conceivable to photograph the incoming deposit containers 1, in particular bank deposit bags 2, at the processing station 22 or e.g. on a conveyor belt T leading thereto, optionally from several sides. The photos are then used for reading bank deposit bag data, in particular an associated serial number which is applied to the bank deposit bag and can be determined automatically by means of an OCR reader.

EXAMPLE c3

If processes at the cash center CC are managed with cash center management software, hereinafter referred to only as software, the data of the deposit are inputted to the associated software of the evaluation device, i.e. a computer 4, which is connected to computers at all processing stations via signal lines. As mentioned, this data transmission can be effected separately from the transport containers 1 e.g. via an EDI or Internet connection, on the one hand. Alternatively, the data are inputted e.g. manually or read from a chip of the transport container 1. To permit assignment of the data records in the software to the deposit, identification data such as a serial number of the associated transport container 1 are at least recorded, e.g. by scanning a corresponding bar code of the container 1.

It can be provided additionally or alternatively to assign and add an information card 6 to the individual deposits. For this purpose, unique identification data from information card 6 and assigned deposit or associated transport container 1 are inputted by these data being e.g. inputted manually or an applied serial number scanned. Then the information card 6 is stored together with all deposit contents BN in the common deposit container 5. This assignment by software and/or information card 6 has the advantage that it permits simple retracing and assignment of the deposits, in particular also to the associated deposit data records in the software for the subsequent accounting of the deposits, during all processing operations, depending on the processing operation.

EXAMPLE c4

As mentioned, it can also be of advantage in some cases if the individual deposits or deposit containers 1 are assigned at the cash center only unique identification data, such as a consecutive number, but no deposit data, in particular on their putative value. The deposit data should in this case be accessible only to certain persons who are responsible for the final accounting.

EXAMPLE c5

If a deposit consisting of several parts is delivered, being delivered for example in a cassette 2 and a bank deposit bag 3, the contents of the cassette 2 and the associated bank deposit bag 3 will preferably not be processed separately from each other, but first brought together and only then processed further as a common deposit. This leads to lower error rates during later data synchronization of the individual check results in the software.

EXAMPLE c6

A further special idea of the present invention is that data are transmitted from a computer 4 at the cash center CC which has access to the data on deposits incoming and to be processed, to all or at least some of the bank note processing machines 8, 12 connected to said computer 4 by data line at the cash center CC. The transmitted data are deposit-related and are used for preconfiguring the machines 8, 12 for deposits to be subsequently processed on said machine.

EXAMPLE c7

The machines are thus transmitted e.g. control and/or configuration data and/or other machine parameters stating e.g. which parameters and/or processing mode are to be used for processing, e.g. transporting and/or checking by associated sensors, a specific subsequent deposit in the machine. It can e.g. be provided that, according to a further idea to be described more exactly hereinafter, bank notes from money dispensing devices which have not been in customer contact, i.e. not dispensed in the meantime, and are normally stored in proper orientation and sorted by denomination, are processed without an authenticity check and/or fitness check and/or orientation check and/or orientation sorting, while other deposits which were e.g. deposited by buyers are checked by the stated checking operations.

EXAMPLE c8

Besides specifying the check mode and/or the sorting criteria for different deposits, the processing mode can e.g. also be fixed by e.g. fixing and deciding for the particular deposit whether the two-stage processing mode described in detail hereinafter or the one-stage processing mode is to be carried out.

EXAMPLE c9

In the stated transmission of data on deposits to be processed, data can be transmitted to a specific machine. This can be done e.g. by the operator inputting the identification data of the particular deposit on the machine 8, 12 or said identification data being recorded automatically. The machine will then produce a data connection with the computer 4 to load the associated data relating to the particular deposit for presetting the machine 8, 12.

EXAMPLE c10

For better control, it can also be provided that when there are a plurality of machines with the same function, a specific deposit is to be processed only on a specific one of said machines according to a specification by the software of the computer 4, by only said machine being transmitted said data and/or a deposit-related enabling signal which allows processing of the deposit in the particular machine enabled.

EXAMPLE c11

However, it may also be that data are not only sent to the machines on request, but that all possible data are always transmitted to all or at least some of the machines connected to the computer 4 so that they always have the suitable data available directly for a deposit subsequently to be processed there.

d) Processing of Deposits—First Stage (Cash Center):

The thus prepared deposits are then distributed over a plurality of first processing stations 7. In a first stage of processing, all bank notes BN of a deposit are counted there and the counting data compared with the customer's accompanying information on the particular deposit. Counting is preferably done automatically with a counting device 8 as the first processing machine 8, which has an input pocket 9 and at least one output pocket 10 and is assigned to the particular processing station 7. The counting device 8 is operated such that all bank notes BN of a deposit are inputted into the input pocket 9 and counted, their value determined, and the bank notes outputted into the output pockets 10.

EXAMPLE d1

It is preferable to use a desktop counting device 8 which has an input pocket 9 and a plurality of output pockets 10. The counting device 8 used is e.g. a desktop counting device 8 as described in DE 199 58 017 A1. Such devices 8 with a plurality of output pockets 10 have the advantage that they can be used not only for counting but also for already sorting according to given criteria.

EXAMPLE d2

Besides the determination of value, an authenticity and/or fitness and/or orientation check can for example also be performed in the counting device 8. Thus, e.g. all bank notes BN of a specific currency that are in a first orientation and accepted, i.e. recognized as authentic, can be outputted to a first output pocket 10, all accepted bank notes BN in another orientation to a second pocket 10, and all other bank notes BN, such as bank notes not recognized or accepted, so-called reject bank notes, or bank notes of another currency to a third pocket 10.

EXAMPLE d3

If only the bank notes BN of a single deposit are processed at the same time in a counting device 8 by the operator at the processing station 7, it is unnecessary to use separation cards, whose fundamental function is described for example in DE 100 49 435 A1 and which make it possible to separate and distinguish individual deposits when a plurality of deposits are processed simultaneously. If more than one deposit at a time is otherwise to be processed in a counting device 8, the use of e.g. such separation cards is helpful.

EXAMPLE d4

To achieve secure and automated processing of the obtained data, said data are transmitted to the software either directly and automatically via an associated signal line from the counting device 8 to the computer 4, or manually inputted by the operator. For further processing, data can e.g. be inputted on the number and/or value and/or total value of all bank notes BN and/or of the bank notes BN of given categories, such as accepted and not accepted, false and/or suspicious bank notes BN. Further, corresponding data on all other contents of the deposit, such as checks or coins, can also be inputted.

EXAMPLE d5

An increase in time efficiency during processing can be realized when the data on the instantaneously processed deposit is inputted to the software during the processing of the associated bank notes BN of the deposit in the counting device 8. This means e.g. that all relevant data are not first inputted to the software and only then the processing operation started on the associated bank notes in the counting device, but said input is only started during said processing and/or ended during or after said processing.

EXAMPLE d6

According to a further idea, the counting device 8 preferably has a reader unit for reading a unique bank note feature, to permit the inputted bank notes BN of a deposit to be uniquely reconstructed later. This feature can be e.g. the serial number of the bank note BN which is printed on the bank note paper, written to a chip in the bank note or printed on as a bar code. Alternatively, it may also comprise measuring values uniquely characterizing a bank note, such as a distribution of certain microfibers or the like incorporated into the paper, which always varies due to production tolerances and thus uniquely characterizes a bank note. This means that certain bank note-unique features, such as the serial numbers, are subsequently assigned to a deposit. It is thus e.g. possible to again do without the use of separation cards or the like upon subsequent further processing in another bank note processing machine if unique deposit assignment is desired.

EXAMPLE d7

In some cases the cash center CC receives deposits that are checked by the cash center CC and only credited to the customer's account after complete processing, in particular after all automatic checking operations are carried out. If in such cases the total value and optionally the authenticity of the inputted bank notes BN is already automatically determined or checked in the first stage of processing, an accounting of the incoming deposits and crediting to the customer can be effected fast. This has the further advantage that the bank notes BN subsequently no longer necessarily have to be assigned to a specific deposit. Thus, they can be processed together with the bank notes BN of other deposits in subsequent checking or other processing operations.

EXAMPLE d8

An increased automation level can be achieved if the bank notes BN are not removed from the delivered cassettes 3 manually for further processing, but can be singled out of the cassettes 3, as described e.g. in DE 101 18 981 A1. In this case specifically, for inserting cassettes 3 of different constructions the machines will have a plurality of different adapters or replaceable adapters. Since cash centers CC must indeed process cassettes 3 of different constructions, this variant is particularly advantageous for ensuring efficient processing of such cassettes 3 with a common device 8.

e) Processing of Deposits—Second Stage (Cash Center):

After this first stage of processing, in which in particular the value of the bank notes BN of the deposit was determined, the associated data inputted to the software and the bank notes BN optionally already sorted automatically by orientation, all bank notes BN of a deposit are brought to a second processing station 11 in the same cash center building, where they are processed further.

The division of processing into two stages has the advantage that recording, counting and accounting of the individual deposits can be effected quickly at the processing station 7 of the first stage, while more extensive operations not absolutely necessary e.g. for the accounting of the deposits, such as carrying out a fitness check or making up the accounted-for bank notes BN, can be effected subsequently and separately therefrom at a second processing station 11 only when e.g. enough deposits for efficient processing at high throughput rates are present.

EXAMPLE e1

Further processing will preferably be effected with a different machine 12 from that used for checking in the first stage, i.e. in particular a machine of a different type. Specifically, a larger bank note processing machine 12 will be used which differs with regard to functionality and/or efficiency and in particular performs different checking operations and/or has a higher maximum hourly throughput. The machine can preferably also have a plurality of output pockets 13 (six output pockets in FIG. 2) to permit sorting according to given criteria to be performed. For this purpose, it is possible to use e.g. a bank note processing machine 12 as described in DE 198 10 928 A1.

While a small, inexpensive counting device 8 can thus be used in the first stage to permit deposits to be processed separately from each other, it will be very expedient to use a larger dimensioned bank note processing machine 12 in the second stage in which a plurality of deposits can be processed together. However, if the counting device 8 of the first stage can also perform e.g. orientation sorting due to the plurality of output pockets 10, only bank note processing machines 12, specifically sorting machines, with half as many output pockets 13 will be required in the second stage for the final and normally required sorting of bank notes BN according to denomination, orientation and fitness, in comparison with only one-stage processing with only one bank note processing machine 12.

The criteria for selecting a certain one of the existing machines can thus be not only size, i.e. the amount of bank notes in the deposit, but also the fitness of bank notes, the type of deposit and/or the type of previous processing operations (such as previous orientation sorting and/or authenticity recognition, etc.).

EXAMPLE e2

Specifically, the process step of the second stage can be such that the input pocket 14 of the large processing machine 12 is loaded with the prepared bank notes BN of the deposit. It is particularly expedient if both the bank notes recognized as authentic according to the check in the first stage and the reject bank notes are inputted to the input pocket 14 of the second machine for another check, while the bank notes already categorized as false or suspicious are separated and need not be rechecked. The inputted bank notes BN are then singled, checked and once again counted automatically in the machine 12 and outputted to the pockets 13 sorted according to denomination. After a predetermined number of e.g. 100 bank notes BN has been stacked into the individual pockets 13 during the processing of one or more subsequent deposits in the machine 12, the bank notes BN are bundled and banded either automatically in the machine 12 itself or manually. The data of the recount in the second stage are likewise transmitted automatically to the software, i.e. the computer 4.

EXAMPLE e3

A further idea of the present invention is thus that data of both the first and second checks in two different machines 8, 12 enter into the data acquisition and deposit evaluation by the software. This leads to particularly secure recording and accounting of the deposits. This applies at least to the case that the final accounting and crediting of the deposits is not already effected after the first stage.

EXAMPLE e4

Specifically it can be provided that the two machines 8, 12 are connected to the software, i.e. the associated computer 4, via a signal line, so that the data of both machines are automatically taken into account in the evaluation of the deposit processing.

EXAMPLE e5

A further special idea is to perform a two-stage check during the successive check with two machines 8, 12. The check can consist for instance in counting, sorting according to orientation and/or denomination, in checking authenticity and/or fitness. This can consist, on the one hand, in such a checking operation being performed multiply, i.e. at least once, in each of the two machines 8, 12 to increase the accuracy of the check.

EXAMPLE e6

The two-stage check can thus also have the feature that data of the first stage are taken into account in the check in the second stage.

A two-stage fitness check can be performed for example in such a way that bank notes with good quality, according to the check in the first counting device 8, are processed further in a first processing machine 12*a* of the second stage, and bank notes with poor quality in a second, separate processing machine 12*b* of the second stage. This separation according to the fitness criterion has the consequence that the processing machine 12*a* of the second stage has a lower risk of jams for "good" bank notes than the processing machine 12*b* of the second stage for "poor" bank notes, so that a considerably higher throughput in processing can be obtained. The machines 12*a*, 12*b* for the different qualities can therefore also be designed in different sizes.

To this end, it can also be provided that the first machine 8 and the second machine 12 are connected to each other via a signal line, and data from the first check of a certain deposit are transmitted to the second machine in order to perform a check of the certain deposit in dependence on the transmitted data of the first machine.

EXAMPLE e7

Further, it can be provided specifically also in the event that the first machine 8 transmits data on a certain deposit to the second machine 12, that not the first machine 8 but only the second machine 12 is connected to the computer 4 in order to perform more extensive processing or evaluation of the data of both machines 8, 12 in the software.

EXAMPLE e8

Alternatively, if the check in the first machine 8 is sufficiently accurate, it is also conceivable to perform the particular check only in the first machine and no longer in the second machine 12. If bank notes can be identified uniquely in the check by their features and/or by their known order, a recheck of authenticity can be omitted in the second subsequent check in the second machine 12 e.g. when the first machine 8 can check authenticity accurately enough. This increases the throughput speed, since fewer measuring data need to be recorded and evaluated.

EXAMPLE e8

According to a further idea of the present invention, it can be provided that only certain bank notes of the deposit are checked for certain check criteria in the second checking operation in the second bank note processing machine 12, in dependence on the check result of the first checking operation in the first bank note processing machine 8.

This is expediently applicable in particular also when the bank notes BN can be identified in the second machine 12 in the check e.g. uniquely by their serial number or unique measuring features and/or by their known processing order in the second machine 12.

It can thus be provided particularly advantageously that only those bank notes BN whose authenticity could not be ascertained with sufficient certainty in the first checking operation are rechecked for authenticity in the second machine 12. Alternatively or additionally, it is also possible that only the bank notes recognized as clearly authentic in the first checking operation are examined for fitness in the second checking operation.

EXAMPLE e9

It can also be provided that the check is effected with different accuracy and/or different acceptance criteria in the two machines 12. Thus, e.g. an authenticity check can be performed in the processing machine 12 of the second stage with higher accuracy than in the processing machine 8 of the first stage.

EXAMPLE e10

Preferably, the processing machines 8, 12 of the first and second stages are not only connected to the computer 4 of the software via a signal line, but also to each other via signal lines in order to permit data to be transferred from one to the other machine 8, 12.

EXAMPLE e11

Further, transport lines, such as conveyor belt systems, are preferably used for transporting bank notes from one processing station to the next processing station. In the representation of FIG. 2, said conveyor belt systems can be installed for example along the transport paths which are marked by the arrows T.

Alternatively or additionally, dispatch tube systems can e.g. also be used to connect the machines 8, 12. Such pneumatically operating systems are known for example from DE 100 02 641 A1 or EP 0 690 423 A1. In this case the transport paths are preferably sealable in such a way that no manual access to transported bank notes BN is possible.

EXAMPLE e12

If the transport lines are used for transporting bank notes BN fully automatically from one machine to the next, e.g. to transport bank notes BN checked in the first processing machine 8 directly to the second processing machine 12, the pressingly machine 8 of the first stage will preferably be constructed such that bank notes BN can be stacked directly into the dispatch tube containers to be transported and be singled directly out of said dispatch tube containers upon arrival at the second processing machine 12. Stacking will consequently be effected directly into the dispatch tube containers themselves and singling out of said containers themselves. Alternatively, grippers with transport means can be provided to permit bank notes BN stacked on a tray to be removed as a bundle and inputted to the dispatch tube containers for transport, or be removed as a bundle later for further singling in the second machine 12.

EXAMPLE e13

In particular in the event that stacking is to be effected into the dispatch tube containers themselves and/or singling out of the same, it can be provided that the dispatch tube containers do not have a circular or cylinder form but a square form at least in the area where stacking or singling is to be done. This leads to lower space requirements during transport of a bundle of several hundred bank notes BN. However, it can be provided that at least the underside of the container has a curved form corresponding to the dispatch tube wall, so that the container can slide easily on its underside.

f) Alternative Processing of Deposits (Cash Center):

Instead of or in addition to the above-mentioned two-stage processing in two machines 8, 12, a further process can also be performed in which all stated operations are performed with only one machine per deposit. In such a one-stage process, all automatic counting, checking and sorting operations are thus performed in a single machine. For this purpose, a machine 12 corresponding to the above-mentioned use in the second stage is preferably used which allows authenticity and fitness checking and optionally orientation sorting.

This procedure is primarily suitable for deposits with large amounts of money, while the two-stage process, in which individual deposits are first accounted for separately on the small counting devices 8, is of advantage in the presence of small deposits with few bank notes.

EXAMPLE f1

Processing of a plurality of deposits at the same time on one machine 12 can be effected e.g. with the help of the above-mentioned separation cards, whose fundamental function is described for example in DE 100 49 435 A1.

EXAMPLE f2

Alternatively, it is also of advantage in particular for processing small to medium-sized deposits to use a so-called "fast deposit" mode. As described in detail in the applicant's DE 100 49 433 A1, a new accounting unit is opened up automatically when a new process number is inputted for a deposit, e.g. read from a separation card by means of a bar code reader, and processing of the previous deposit is completed. Completion of the previous deposit is determined by checking the input pocket by ascertaining whether the singler is empty and all bank notes BN of the previous deposit have already been processed.

EXAMPLE f3

The one-stage processing operation is in particular also suitable for processing stocks of cash which were not outputted since they were first put into circulation or since the last check of authenticity and/or fitness and/or the last orientation sorting. These may be e.g. bank notes which were used to fill a money dispensing device AT, e.g. at the cash center, and not yet outputted (or newly deposited) upon a subsequent change of cassette. Upon separate handling of such deposits with a one-stage processing operation, a check of authenticity, fitness or orientation of the bank notes BN can specifically also be omitted for such deposits.

g) Processing of Reject Bank Notes (Cash Center):

The treatment of reject bank notes, i.e. bank notes not recognized and/or classified as false or suspicious in the automatic check, can proceed as follows.

EXAMPLE g1

The reject bank notes of both the first and second stages, or only the second stage if all non-false/suspicious reject bank notes were rechecked in the second machine 12, are stored at a further workstation 15 for post-processing together with the information card 6 which is assigned to the specific deposit in the software. For post-processing of the reject bank notes of a deposit, the associated data are then read from the information card 6 and e.g. a machine-readable serial number or the like scanned from the information card 6. Since the information card 6 was assigned to a specific deposit in the software upon receipt or in the first processing stage, a unique relation with the particular deposit is thus produced.

The denominations of the individual authentic reject bank notes recognized by the operator and the number or stated denomination of false or suspicious bank notes are now inputted at the workstation 15 and processed by the software, so that a final accounting of the deposits can then be effected.

Then these reject bank notes, like the bank notes BN categorized as authentic and fit for circulation or authentic and unfit for circulation in the previous checks, are stored in a vault area 17.

EXAMPLE g2

As mentioned above, however, it is also possible and of advantage for this final accounting to be already effected after the first stage and optionally a corresponding recording of the reject bank notes of the check of the first stage.

EXAMPLE g3

It is also optional that reject post-processing be effected at a separate workstation 15. The data can basically also be inputted on the machines 8 or 12. Data input on the second machine 12 only makes sense, however, when large deposits are processed on the machine 12, since undesirable standstills of the machine otherwise occur due to the time-consuming input of reject data.

EXAMPLE g4

It may be that there are deviations between target and actual data, such as a deficit resulting between the data nominally stated by the customer, such as the total amount and/or the number of bank notes BN per denomination which should basically be present in the deposit, and the data actually determined, optionally after consideration of the reject bank notes, after the one- and/or two-stage check in the cash center CC. The target data are transmitted to the cash center CC, as mentioned above, by the customer separately from the deposit itself or are also supplied together with the deposit by the data being e.g. applied to the transport container 1 or added thereto. A so-called difference log stating the relevant data (deviation, deposit, customer, account, cash center handler and/or date, etc.) can be created for information purposes.

In the event that the deposits are cassettes 3 removed from deposit/dispensing devices AT, the target data can also be data such as counter readings or other information from the associated deposit/dispensing devices AT at the time of removal of the cassettes 3 stating how many bank notes BN should basically be contained in the cassettes 3.

EXAMPLE g5

Preferably, a signal is automatically emitted by the software or another unit only when the deviations exceed or undershoot a certain value or there are corresponding deviations from a given range of values, said signal being transmitted e.g. to a supervisory workstation 16 at the cash center CC, so that an administrator can perform a check on the deviation in the specific deposit to ascertain e.g. whether the cause of the error is more likely to be a problem of inaccurate target information from the customer or an error during processing of the deposits at the cash center CC. These ranges of limiting values or thresholds can preferably also be changed by the administrator from the supervisory station 16.

EXAMPLE g6

This signal triggering is preferably effected upon deviations also during fully or largely automated processing of deposits in order to become aware particularly easily of possible disturbances in the machines 8, 12 or associated data acquisition.

EXAMPLE g7

In the automatic check of bank notes BN at the cash center, e.g. in the authenticity check in the machines 7 or 12, a warning signal is preferably always produced and displayed optically and/or acoustically and/or a corresponding signal passed on by data line to a computer, in particular of the reject post-processing station 15 and/or the supervisory workstation 16, when a false and/or suspicious bank note BN is detected in the check.

This warning signal is preferably passed on together with further data on the associated deposit which uniquely characterize it. This warning signal is then taken as a pointer to check the reject bank notes of the particular deposit particularly exactly, i.e. at least according to a different processing mode, e.g. specifically with an exact authenticity check, compared to reject bank notes of other deposits without recognition of such false and/or suspicious bank notes BN for which e.g. such an authenticity check is unnecessary.

EXAMPLE g8

Particularly preferably, this signal will be produced upon an authenticity classification in the supervised machines 7, 12 with the classification categories "clearly false" and "suspicious" only when a "suspicious" bank note BN, i.e. not when a "clearly false" bank note, has been recognized. This permits the additional expenditure of work for reject post-processing to be focused on only those deposits requiring a particularly exact check.

h) Compilation of Deposits (Cash Center):

A further task of cash centers CC is to make up deposits on order on behalf of the customers, i.e. to compile them according to total value and/or number of bank notes BN per denomination, the deposits then being delivered to the customers by the security transport companies according to the order. This means for example that a merchant orders his stocks of change for the next day, or the stocks of cash for filling automatic cash dispensers are made up in associated cassettes 3 on behalf of a commercial bank.

This customized compilation can be effected either manually by an operator at a separate processing station 19 and/or automatically by means of additional sorting machines 20 with a plurality of output pockets 21 located in this area, as described in the applicant's DE 100 46 082 A1.

EXAMPLE h1

It is particularly preferable to use for customized compilation no separate, or at least not exclusively the separate, sorting machines 20. It can also be provided to use the sorting machines 12 with a plurality of output pockets 13 used in the above-described process steps e) or f) for processing and accounting for incoming deposits in order to make up the bank notes to be sorted in such a way that they can be used for a present order. This can consist e.g. in a predetermined number of bank notes per denomination being stacked into the individual output pockets 13 and then optionally also banded in the machine 12 according to a customer's order amount.

Use of the machines 12 both for deposit processing, in particular accounting for and validating, incoming deposits and for making up outgoing deposits, i.e. orders, permits the money flow within the cash center to be reduced, since at least some of the bank notes of the incoming deposits at the cash center can be reused, i.e. used for an order, directly without intermediate storage in a vault 17.

EXAMPLE h2

An automatic recording of all inputs and outputs of cash hitherto effected, instantaneously performed and/or to be expected e.g. due to orders is preferably performed here. The associated data are used for performing optimized inventory management in order to minimize the unused amounts of cash present at the cash center CC in the vault area 17, and thereby save interest arising because the cash center CC must pay interest for amounts of money on stock to the commercial bank GB or the central bank ZB.

EXAMPLE h3

Normally, only those bank notes BN already in circulation and deposited that have successfully undergone a given automatic authenticity and fitness check are re-outputted to the commercial banks GB or merchants H and private persons PK or used for filling money dispensing devices AT.

This check can be effected either in so-called recycling devices, i.e. combined deposit and dispensing devices AT, which re-output e.g. to private persons PK authentic and fit bank notes BN that have been deposited and accepted according to the stated checks. Alternatively or additionally, it is provided in some countries that this check is effected at the state central banks ZB themselves.

According to a further idea of the present invention, this check can also be performed effectively in the following way when no recycling devices are used.

There are deposit devices AT that do not perform a fitness check or at least not a state-certified fitness check suitable for recycling, but have a checking device that performs a check of authenticity according to given criteria state-certified for authenticity recognition. This may be e.g. a distinction according to "no bank note", "false bank note", "suspicious bank note" and "authentic bank note".

It can now be provided to subject all bank notes categorized as suspicious and authentic to a fitness check in large processing machines 12 either at the central bank ZB itself or at a cash center CC, in order to separate out bank notes BN to be put back into circulation. This share of bank notes BN to be processed and optionally transported to the central bank ZB can be reduced if only the bank notes BN categorized as authentic are submitted to an associated fitness check at the cash centers CC in a step corresponding to the above-mentioned first deposit processing stage with the help of the small counting devices 8. Those bank notes BN that were then judged as authentic by the deposit device AT and as being sufficiently fit for recycling by the counting device 8 are reused for filling automatic cash dispensers AT. In the fitness check, in which the fitness of the bank note is classified e.g. into the classes "unfit for recirculation" or "fit for recirculation", the degree of soiling or the presence of holes, tears, adhesive strips or the like can be checked in the usual way.

EXAMPLE h4

According to a further special idea of the present invention, functions of a cash center are performed in a security transport vehicle itself.

Thus, the security transport vehicle can be for example loaded with stocks of cash that are already prefinished in certain amounts and not yet assigned to a customer, i.e. to a cash order. If the security transport vehicles are connected to the cash center CC by means of a wireless data line, data on orders to be subsequently processed can be transmitted to the security transport vehicles e.g. also during a trip. The driver can then promptly go to the particular customer and compile a desired make-up for the customer with the prefinished bank notes stored in the security transport vehicle.

EXAMPLE h5

In an extension of this idea, it is also conceivable that some or all of the process steps stated in the above chapters a) to e) are performed in the vehicle itself e.g. by means of one or more machines 8, 12 located therein. Thus, e.g. the counting and determination of value and optionally already the accounting, i.e. validation, of the deposits picked up at a first place can be performed in the security transport vehicle itself by means of at least one machine 8 installed therein during the trip to another place (bank, cash center).

i) Other Process Steps (Cash Center):

EXAMPLE i1

To permit the handling of stocks of cash at the cash center CC to be better monitored, it can be provided for example to mount surveillance cameras 18 in the area of the individual processing stations at the cash center CC. The recorded digital image data are advantageously stored together with data of the instantaneous transaction, i.e. of the instantaneously processed deposit. This can be done particularly easily and reliably by these transaction data being displayed automatically in the image of the surveillance camera 18.

The data of the surveillance cameras 18 can thus be used in combination with deposit data recorded in the software in the computer 4 for obtaining complete monitoring of the money transport at the cash center.

EXAMPLE i2

As mentioned above, a log with the relevant data (customer, account, deposit identification, date, number of forgeries, number of bank notes per denomination and/or total value, etc.) is created for each deposit processing operation. Although also possible, these data are preferably sent to the customers not in paper form but in paperless form, e.g. by fax or e-mail. The data can be so prepared that customers can add the data to a database system.

The invention claimed is:

1. A system for processing deposits of bank notes, comprising:

a first bank note processing machine with at least one input pocket, at least one checking device and at least one output pocket for subjecting the bank notes of a deposit to a first checking operation;

a second bank note processing machine with at least one input pocket, at least one checking device and at least one output pocket, the second bank note processing machine arranged to subject bank notes of the deposit that were previously checked by the first bank note processing machine to a second checking operation, the bank notes of the second checking operation including all bank notes qualifying as authentic or reject bank notes in the first checking operation and excluding bank notes categorized as being false or suspicious in the first checking operation; and an evaluation device to which data of both the first and second checking operations are supplied for performing an evaluation of the deposit on the basis of both the first and second checking operations.

2. The system according to claim 1, wherein the second bank note processing machine differs with regard to functionality and/or efficiency in comparison with the first bank note processing machine.

3. The system according to claim 2, wherein the functionality and/or efficiency of the second bank note processing machine differs from the first bank note processing machine by performing different checking operations and/or having a higher maximum hourly throughput.

4. The system according to claim 1, wherein both the first and second bank note processing machines are connected to the evaluation device via signal lines to enable data on the checking operations to be transferred automatically to the evaluation device.

5. The system according to claim 1, wherein different types of deposits, such as deposits of different size or different customers, are checked automatically by different bank note processing machines and/or with different processing sequences.

6. The system according to claim 1, wherein when checking the same deposit the second bank note processing machine performs different checking operations or the same checking operations, optionally with different accuracy and/or different acceptance criteria, from the first bank note processing machine.

7. The system according to claim 1, wherein in the second checking operation in the second bank note processing machine only certain bank notes (BN) of the deposit are checked for certain check criteria, in dependence on a check result of the first checking operation in the first bank note processing machine.

8. The system according to claim 1, wherein for carrying out the second checking operation of the second bank note processing machine, data on the result of the first checking operation of the first bank note processing machine are supplied by the first bank note processing machine and/or by the evaluation device.

9. The system according to claim 1, wherein the first bank note processing machine performs an authenticity check without a fitness check, and the second bank note processing machine performs a fitness check optionally without an authenticity check.

10. The system according to claim 1, wherein the first bank note processing machine performs an authenticity check, determination of denomination and orientation sorting of the bank notes of the deposit, and the second bank note processing machine performs a fitness check of the authentic bank notes (BN) of the same deposit sorted according to orientation.

11. The system according to claim 1, including a reader unit for reading a unique bank note feature, such as unique measuring features of the bank notes, and/or a reader for the serial number of the bank notes is integrated in the first bank note processing machine.

12. The system according to claim 1, wherein, for inserting cassettes of different constructions, the first and/or the second bank note processing machine has a plurality of different, firmly mounted adapters or at least one replaceable adapter.

13. The system according to claim 1, wherein data on deposits to be processed in a future processing operation are transmitted from an external device to the evaluation device, together with or independently of the transport of the deposits to the assigned bank note processing machines.

14. The system according to claim 1, including a surveillance camera installed in a room where the bank notes of the deposit are processed, and data on a deposit instantaneously processed within a range of the surveillance camera are linked with image data.

15. The system according to claim 14, wherein a data output of the first and/or second bank note processing machine is coupled with the surveillance camera and/or an associated supervising unit in such a way as to transfer data that relate to the instantaneously processed deposit and that are delivered by the bank note processing machine or machines.

16. The system according to claim 1, wherein the first checking operation in the first bank note processing machine comprises a fitness check of the bank notes, and bank notes with different fitness are processed further in different second bank note processing machines.

17. The system according to claim 1, wherein upon a successive check of the bank notes of a deposit in two bank note processing machines, the accounting of the deposit is already effected after the first checking operation in the first bank note processing machine.

18. The system according to claim 1, wherein at least one output pocket of the first bank note processing machine is connected to at least one input pocket of the second bank note processing machine via a dispatch tube connection.

19. The system according to claim 1, wherein the bank notes are stacked in the first bank note processing machine in a dispatch tube container, and are singled out of the dispatch tube container in the second bank note processing machine connected to the first bank note processing machine via a dispatch tube connection.

20. The system according to claim 1, wherein at least the first and/or second bank note processing machines are connected via signal lines to a computer which has access to the data on deposits incoming and to be processed, and the computer transmits deposit-related data to all or at least some of the bank note processing machines connected by data line to said computer, so that said machines are preconfigured for deposits to be subsequently processed thereon.

21. A method for processing deposits of notes, comprising:
processing notes of a deposit successively in two bank note processing machines, and
supplying the data of both the first and second checking operations to an evaluation device in order to perform an evaluation of the deposit on the basis of both the first and second checking operations;
wherein the second checking operation includes processing all notes qualifying as authentic or reject notes in the first checking operation and excludes notes categorized as being false or suspicious in the first checking operation.

22. The method according to claim 21, wherein different types of deposits, such as deposits of different size or different customers, are checked automatically by different bank note processing machines and/or with different processing sequences, specifically e.g. alternatively a one-stage or a two-stage processing operation with one or two bank note processing machines is selected.

23. The method according to claim 21, wherein the evaluation device receives data from an external device on deposits to be processed in a future processing operation, together with or independently of the transport of the deposits to the assigned bank note processing machines.

24. The method according to claim 21, wherein only the bank notes of a single deposit are processed in a processing operation in the first bank note processing machine, and optionally the bank notes of a plurality of deposits are processed in a processing operation in the second bank note processing machine.

25. The method according to claim 21, wherein the first checking operation in the first bank note processing machine comprises a fitness check of the bank notes, and bank notes with different fitness are processed further in other second bank note processing machines.

26. The method according to claim 21, wherein, upon a successive check of the bank notes of a deposit in two bank note processing machines, the accounting of the deposit is already effected after the first checking operation in the first bank note processing machine.

27. The method according to claim 21, including using transport containers for the deposits, said containers including, and/or have added to them a chip with a memory, and wherein one part of the data to be passed on to the evaluation device and relating to the particular deposit is already prestored in said chip, and for compiling deposits to be processed only a remaining part of the data to be passed on to the evaluation device and relating to the particular deposit is stored in the chip.

28. The method according to claim 27, wherein, upon delivery of a deposit in a plurality of, in particular also different kinds of, transport containers, the bank notes of the plurality of transport containers are first brought together and then, as a common deposit, processed further and checked in the first and/or second bank note processing machine.

29. The method according to claim 21, wherein a handheld unit with a scanner is used, with which data for compiling a deposit to be processed are scanned e.g. from a screen or the like.

30. A method for processing deposits of bank notes, comprising:
processing notes of a deposit successively in two bank note processing machines, and
supplying the data of both the first and second checking operations to an evaluation device in order to perform an evaluation of the deposit on the basis of both the first and second checking operations;
wherein a check is made as to whether there are deviations between the actual data of the deposit which were determined by the evaluation device on the basis of the checking operations of the first and/or second bank note processing machines, and the target data of the deposit which were already fixed before the carrying out of the checking operations.

31. The method according to claim 30, wherein a warning signal is emitted when the deviations satisfy a given criterion.

* * * * *